US006911935B2

(12) United States Patent  
Lyon

(10) Patent No.: US 6,911,935 B2
(45) Date of Patent: Jun. 28, 2005

(54) FIELD INTERCHANGEABLE LEVEL MEASUREMENT SYSTEM

(75) Inventor: Quinton Lyon, Peterborough (CA)

(73) Assignee: Siemens Milltronics Process Instruments Inc., Peterborough (CA)

( * ) Notice: Subject to any disclaimer, the term of this patent is extended or adjusted under 35 U.S.C. 154(b) by 38 days.

(21) Appl. No.: 10/642,400

(22) Filed: Aug. 15, 2003

(65) Prior Publication Data

US 2005/0035901 A1 Feb. 17, 2005

(51) Int. Cl.[7] ............................................. G01S 13/08
(52) U.S. Cl. ............................ 342/124; 343/700 MS; 367/908
(58) Field of Search .................. 343/700 MS, 703; 342/124, 174, 175; 367/99, 908

(56) References Cited

U.S. PATENT DOCUMENTS

| | | | |
|---|---|---|---|
| 5,841,401 A | 11/1998 | Bodley et al. | |
| 5,936,155 A | 8/1999 | Francois et al. | |
| 5,954,526 A | 9/1999 | Smith | |
| 6,094,170 A | 7/2000 | Peng | |
| 6,111,520 A | 8/2000 | Allen et al. | |
| 6,118,426 A | 9/2000 | Albert et al. | |
| 6,178,817 B1 * | 1/2001 | Hewelt et al. | 73/290 V |
| 6,292,131 B1 * | 9/2001 | Wilke et al. | 342/124 |
| 2002/0109626 A1 * | 8/2002 | Spanke | 342/124 |
| 2004/0108860 A1 * | 6/2004 | Spanke | 324/644 |
| 2004/0113853 A1 * | 6/2004 | Serban et al. | 343/703 |
| 2004/0124854 A1 * | 7/2004 | Slezak | 324/644 |
| 2004/0201516 A1 * | 10/2004 | Lyon | 342/124 |
| 2004/0212529 A1 * | 10/2004 | Fehrenbach et al. | 342/124 |

\* cited by examiner

Primary Examiner—Tan Ho
(74) Attorney, Agent, or Firm—Workman Nydegger

(57) ABSTRACT

A microwave-based level measurement system having a planar microwave antenna configuration. According to another aspect, the microwave-based level measurement devices are field interchangeable with ultrasonic based level measurement devices.

21 Claims, 6 Drawing Sheets

FIELD INTERCHANGEABLE LEVEL MEASUREMENT SYSTEM

FIELD OF THE INVENTION

The present invention relates to time of flight ranging and level measurement systems, and more particularly a field interchangeable level measurement system with a planar microwave arrangement.

BACKGROUND OF THE INVENTION

Time of flight ranging systems are commonly used in level measurements, and are referred to as level measurement systems. Level measurement systems are used to determine the distance to a reflective surface (i.e. reflector) by measuring how long after transmission of a burst of energy pulses, an echo is received. Such systems may utilize ultrasonic energy or microwave energy.

Ultrasonic-based level measurement devices typically take the form as shown in FIG. 1 which comprises an ultrasonic transducer housing 10. The ultrasonic transducer housing 10 contains an ultrasonic transducer and the electronic circuitry for providing the level measurement functionality. The ultrasonic housing 10 includes a transducer face 12, typically on the lower or emitter surface, which allows for the transmission and reception of ultrasonic pulses from the transmitter contained in the housing. The ultrasonic level measurement device 10 is coupled through a cable to a computer or a control panel capable of handling multiple devices. The cable 14 provides signals for controlling operation of the transducer, i.e. generation of transmit pulses and reception of receive echo pulses. The receive echo pulses are processed by the control panel to determine the level measurement readings.

Microwave-based level measurement systems 20, unlike ultrasonic-based systems, have a microwave antenna 22 which is coupled to the exterior of the housing 24. The housing 24 contains the electronic circuitry and includes an interface for connecting to the microwave antenna 22. The microwave antenna 22 comprises a dielectric rod antenna as shown in FIG. 2. The rod antenna 22 is made from a low dielectric material such as PTFE. For a less intrusive design, for example for measurement applications in a shallow vessel, the microwave rod antenna 24 (FIG. 2) is replaced by a microwave horn antenna 24 as shown in FIG. 3. The horn antenna configuration is also less susceptible to problems resulting from build-up on the antenna, for example. In processes where there is splashing.

Microwave is affected less than ultrasonic by the gas or dust in the transmission path. In level measurement applications, microwave-based devices have the advantage of providing better resolutions and therefore more precision over ultrasonic-based devices. In addition, microwave-based devices are much more temperature insensitive than ultrasonic-based devices. Ultrasonic-based devices, on the other hand, have a more compact configuration and typically cost less and as such have found widespread use in many level measurement applications.

Even with the advantages of microwave-based systems the inherent incompatibility between the configuration of a microwave-based level measurement system and an ultrasonic-based level measurement system makes a retrofit essentially a new installation for the transducer. In addition, differences in the output signals and signal conditioning for microwave-based and ultrasonic-based level measurement devices do not allow for the interchangeability between the two types of devices in a control panel or level measurement system.

Accordingly, there remains a need for microwave-based level measurement systems which are essentially field interchangeable with ultrasonic-based level measurement or time of flight ranging systems.

BRIEF SUMMARY OF THE INVENTION

The present invention provides a microwave-based field interchangeable level measurement system. In accordance with one aspect, the field interchangeable level measurement system includes a microwave planar antenna arrangement. In another aspect, the field interchangeable level measurement system includes down converter circuitry to generate an output which resembles the output of a conventional ultrasonic-based level measurement system.

In a first aspect, the present invention provides a level measurement system level measurement device for making level measurements of a material in a vessel, the level measurement system comprises: a housing; a transducer for emitting energy pulses and receiving energy pulses reflected by the material contained in the vessel; a circuit having a transmit component and a receive component, the transmit component being coupled to the transducer and the transducer is responsive to a transmit signal for emitting an energy pulse, the receive component is coupled to the transducer and the receive component generates a receive signal in response to a reflected energy pulse being received by the transducer; the circuit includes a port for coupling to a controller, and the port includes an input for receiving transmit control signals, and an output for outputting the receive signal to the controller; the transducer comprises a planar antenna formed on the surface of a printed circuit board, the planar antenna has an input port coupled to the transmit component, and an output port coupled to the receive component in the circuit.

In another aspect, the present invention provides a level measurement system for measuring the levels of materials contained in one or more vessels, the level measurement system comprises one or more microwave-based devices; one or more ultrasonic-based devices; a controller having ports for coupling each of the microwave-based devices and the ultrasonic-based devices, the controller provides control signals to each of the microwave-based and the ultrasonic-based devices to transmit energy pulses and the controller receives reflected energy pulses from each of the microwave-based and the ultrasonic-based devices to generate a receive echo profile for each of the devices and determine a level measurement reading; wherein the microwave-based devices are interchangeable with the ultrasonic-based devices for the controller.

In yet another aspect, the present invention provides a level measurement instrument for making level measurements of a material in a vessel, the level measurement instrument comprises: a housing; a transducer for emitting energy pulses and receiving energy pulses reflected by the material contained in the vessel; a transmitter and a receiver, the transmitter is coupled to the transducer and the transducer is responsive to a transmit signal for emitting an energy pulse, the receiver is coupled to the transducer and the receiver generates a receive signal in response to a reflected energy pulse being received by the transducer; a port for coupling to a controller, and the port includes an input for receiving transmit control signals, and an output for outputting the receive signal to the controller; the transducer comprises a planar antenna formed on the surface of a printed circuit board, the planar antenna has an input port coupled to the transmitter, and an output port coupled to the receiver.

In a further aspect, the present invention provides a level measurement device for making level measurements of a material in a vessel, the level measurement system comprises: a housing; a transducer for emitting energy pulses and receiving energy pulses reflected by the material contained in the vessel; a transceiver circuit having a transmit port and a receive port, the transmit port is coupled to the transducer and the transducer is responsive to a transmit signal for emitting an energy pulse, the receive port is coupled to the transducer and the receive port receives a receive signal in response to a reflected energy pulse being received by the transducer; the transceiver circuit includes a port for coupling to a controller, and the port includes an input for receiving transmit control signals, and an output for outputting the receive signal to the controller; the transducer comprises a planar antenna formed on the surface of a printed circuit board, the planar antenna has an input port coupled to the transmit port, and an output port coupled to the receive port in the transceiver circuit.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the present invention and in which.

DETAILED DESCRIPTION OF EMBODIMENTS OF THE INVENTION

Figure 2:
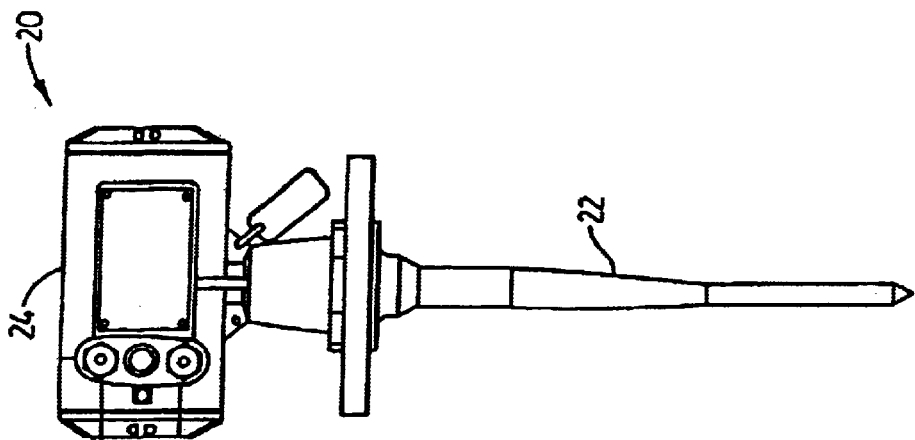
FIG. 2 shows in diagrammatic form a conventional microwave-based level measurement system having a microwave rod antenna or waveguide.
Figure 1:
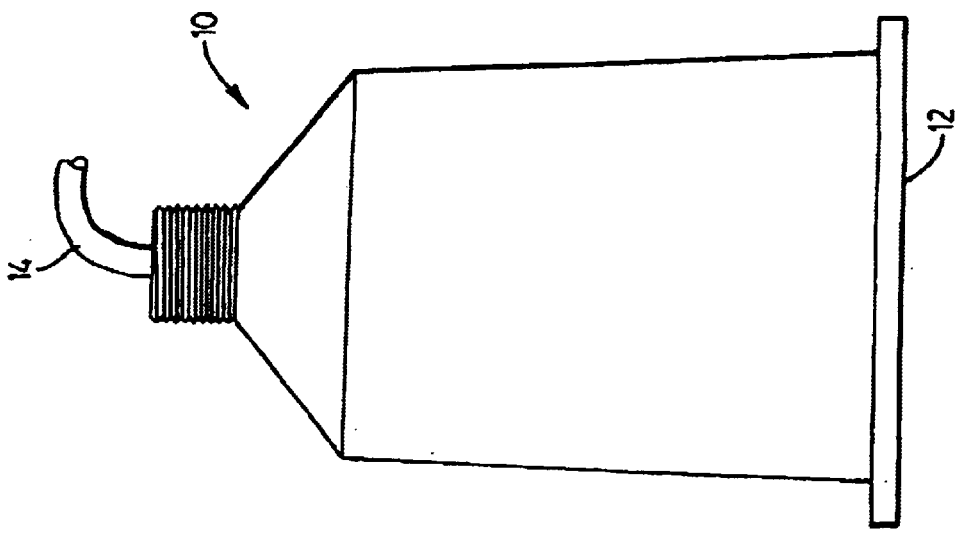
FIG. 1 shows in diagrammatic form a conventional ultrasonic-based level measurement system.
Figure 3:
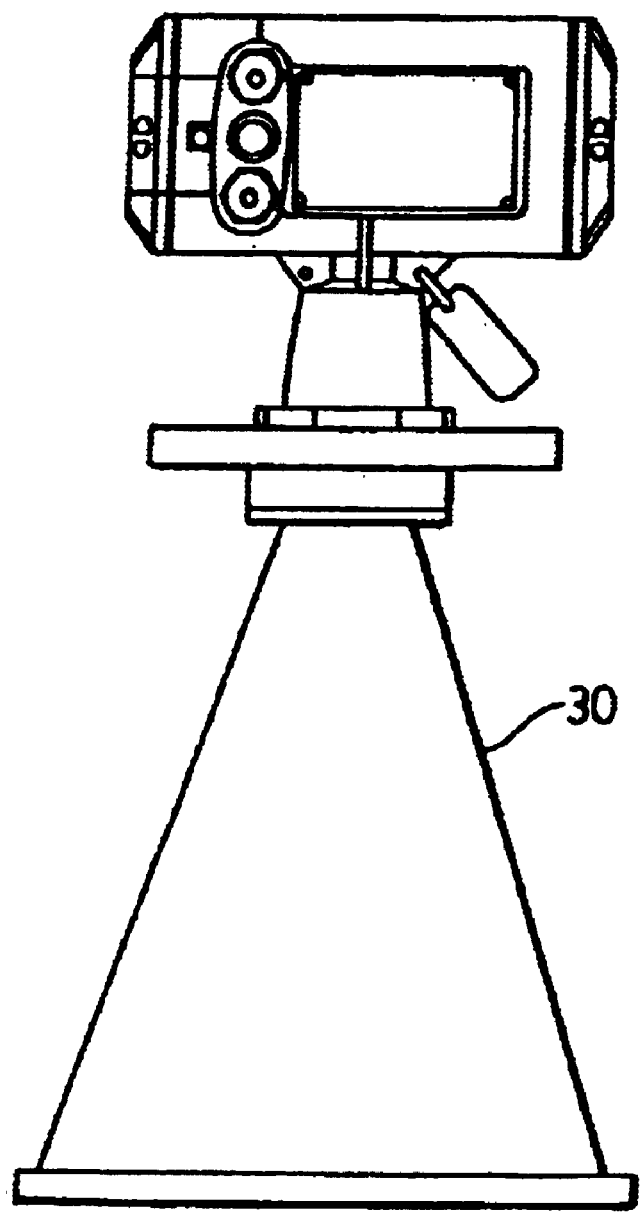
FIG. 3 shows in diagrammatic form a conventional microwave-based level measurement system having a microwave horn antenna/transducer.
Figure 4:
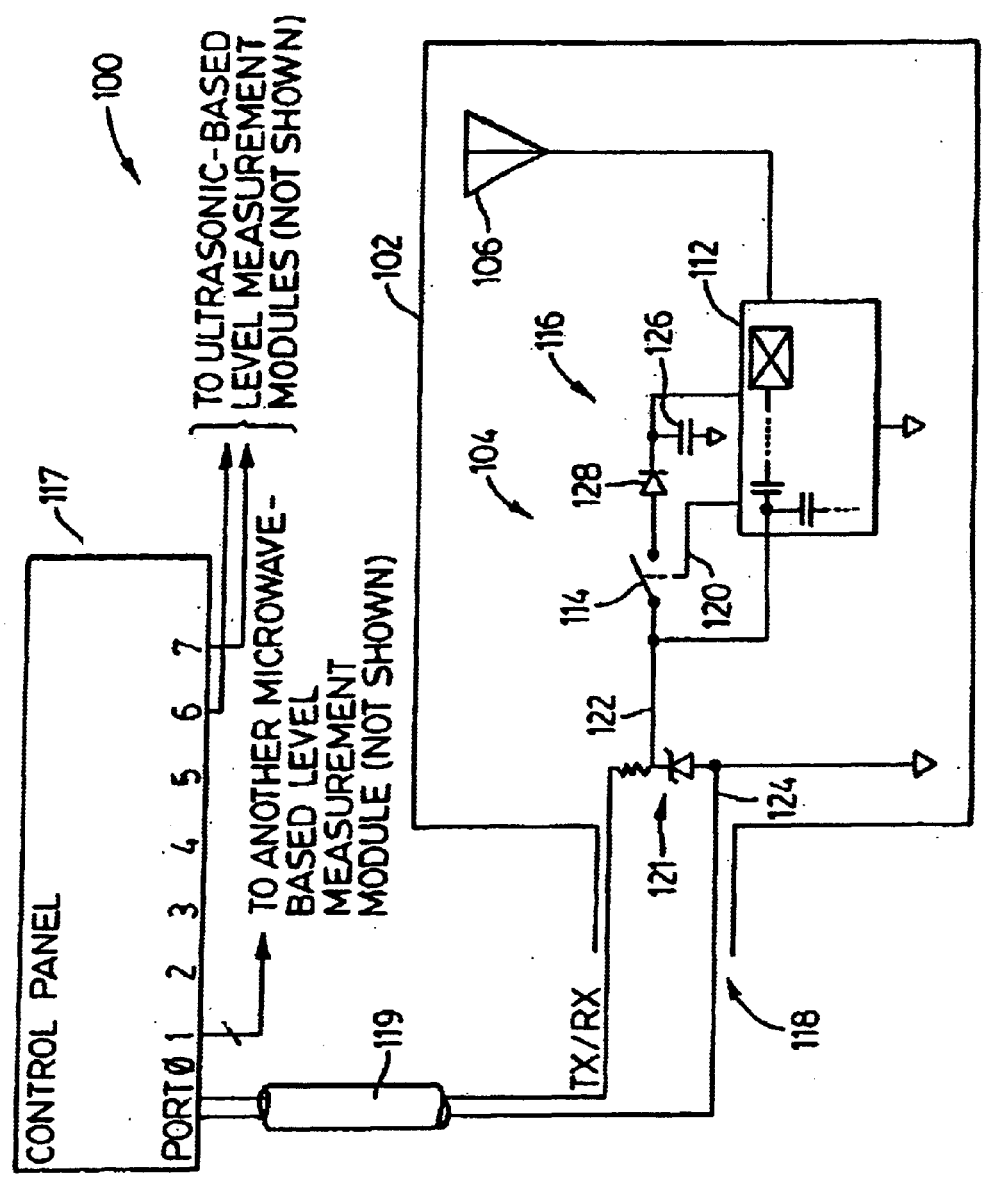
FIG. 4 shows in schematic form a microwave-based level measurement system in accordance with an embodiment of the present invention.

Reference is first made to FIG. 4 which shows in schematic form a microwave-based level measurement device according to the present invention and indicated generally by reference 100. According to one aspect of the invention, the microwave-based level measurement device 100 is field interchangeable with ultrasonic-based level measurement devices as will be described in more detail below.

As shown in FIG. 4, the microwave-based level measurement device 100 comprises a housing or enclosure 102, and inside the housing 102 is contained an electronic circuit 104 and a microwave antenna/transducer 106. The electronic circuit 104 provides the level measurement functionality and as shown in FIG. 4 comprises a microwave transceiver stage 112, and a control switch 114. The microwave-based level measurement system 100 is coupled to a controller 117, for example, a control panel, through an interface port 118. The interface port 118 provides an electrical connection for a shielded cable coupling 119 having conductors for a transmit/receive signal 122, and a ground connection 124 and may also include other control/signal and/or power supply lines (not shown). As also shown, a protection circuit 121 is included and comprises a resistor and a diode (Zener) shunt to ground. The protection circuit 121 provides protection for the microwave circuitry from the high voltage signals normally applied to an ultrasonic transducer which is interchangeable with the microwave-based device 100 as described in more detail more. The controller 117 may comprise a control panel such as the Air Ranger XPL Plus™ panel available from Siemens Milltronics Process Instruments inc. As will be described in more detail below, the microwave-based level measurement module 100 is field interchangeable with ultrasonic-based level measurement modules and as such both types of devices can be plugged into the control panel 117, i.e. the Air Ranger XPL Plus™ system from SMPI Inc.

Referring to FIG. 4, the microwave-based level measurement device 100 may also include a power storage circuit indicated generally by reference 116. The power storage circuit 116 functions to store power for the measurement cycle. As shown, the power storage circuit 116 comprises a capacitor 126 and a diode 128. In operation, the capacitor 126 is charged between measurements, and the charge stored on the capacitor 126 is used during the measurement phase of a level measurement operation. The measurement cycle is controlled by the actuation of the switch 114 which is responsive to control signals 120, which control signals 120 may also be derived from the control panel 117.

In measurement mode, the transceiver stage 112 includes circuitry which functions to convert the high frequency signals, e.g. in the range of 5.8 GigaHertz, from the antenna/transducer 106, into lower frequency signals in the range of 22 KiloHertz. The high frequency signal range will correspond to frequencies as allocated for this purpose, for example, by radio emission regulatory authorities. The lower frequency signals correspond to the output of an ultrasonic-based level measurement device. As will be described in more detail below, the transceiver stage 112 includes circuitry which transmits and receives signals in the microwave frequency range initiated by the control panel 117. In this respect, the microwave-based level measurement device 100 is interchangeable with an ultrasonic-based device and transparent to the control panel 117.

The antenna 106 emits a transmit burst of energy, i.e. radar pulses, that are directed at the surface of a material 290 (FIG. 7) contained in a vessel 301 (FIG. 6). The reflected or echo pulses, i.e. the propagated transmit pulses reflected by the surface of the material, are coupled by the antenna/transducer 106. The output from the antenna/transducer 106 is converted into electrical signals by the receiver stage in the transceiver 112 and then down-converted to a lower frequency which is compatible with the control panel 117, for example, 22 KHz which is in the range of the output generated by ultrasonic-based level measurement devices. The converted output signal from the microwave level measurement device 100 is inputted by the control panel 117 for further processing to generate level measurement readings. The control panel 117 inputs the receive echo signals, and samples and digitizes the signals using an analog-to-digital converter (not shown) and a receive echo waveform or profile is generated. The control panel 117 further executes an algorithm which identifies and verifies the echo pulse and calculates the range, i.e. the distance to the reflective surface, based on the time it takes for the reflected energy pulse to travel from the reflective surface to the antenna/transducer 106. From this calculation, the distance to the surface of the material and thereby the level of the material contained in the vessel is determined. The control panel 117 typically includes one or more microprocessors or other computing devices which are suitably programmed to execute program instructions stored in memory to perform these functions as will be within understanding of those familiar with the art of level measurement systems.

Figure 5:
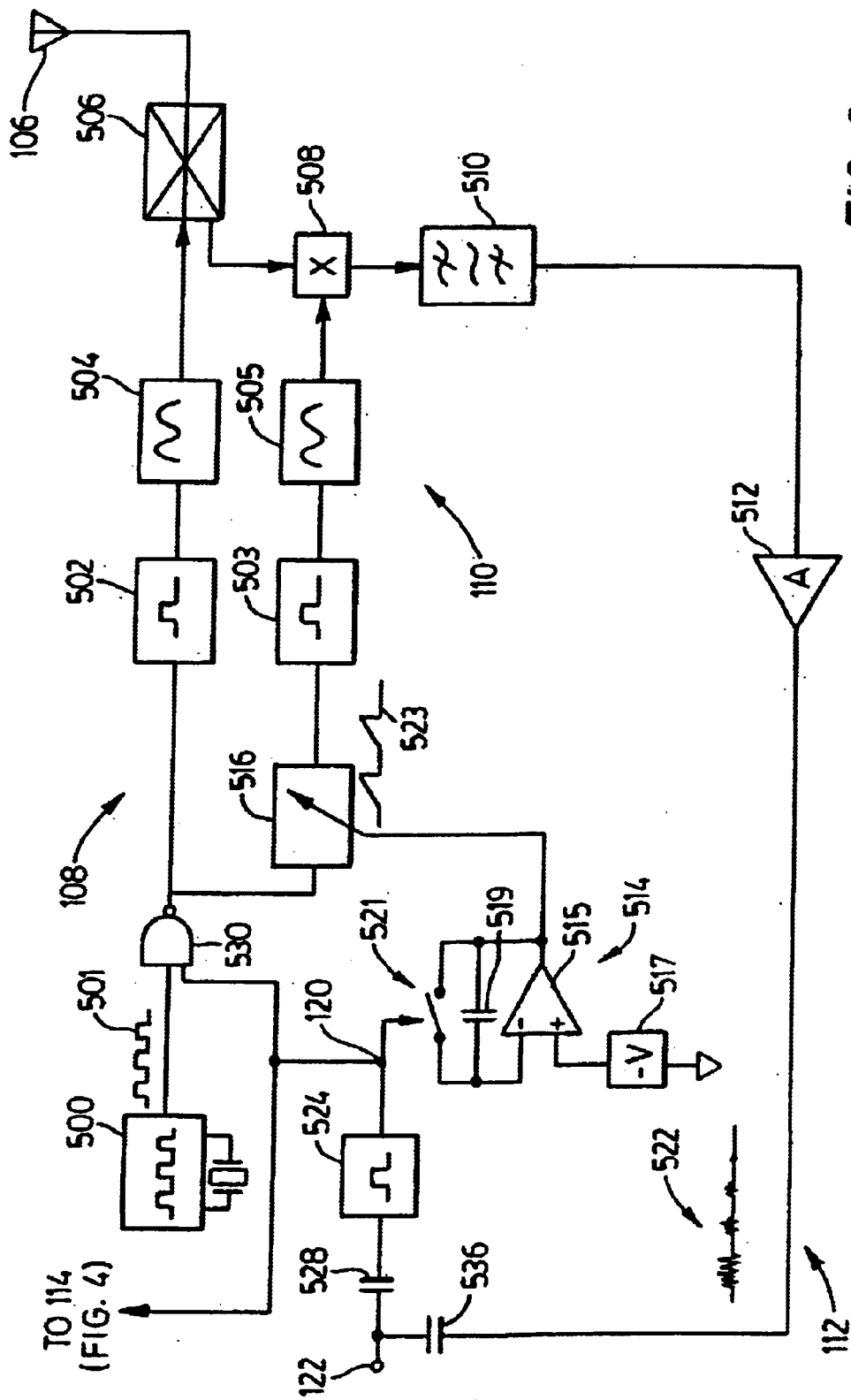
FIG. 5 shows in schematic form a converter stage for the microwave-based level measurement system of FIG. 4.

Reference is next made to FIG. 5, which shows in schematic form an implementation for the transceiver stage 112. As shown, the transceiver stage 112 comprises a clock 500, a narrow pulse generator 502, a second narrow pulse generator 503, a microwave transmitter oscillator 504, a microwave oscillator 505, and a directional coupler 506. As shown, the clock signal 501 from the clock 500 is gated using a gate 530. The gate 530 provides an enable/disable transmitter function. The transceiver stage 112 also comprises a mixer/sampler 508, a band-pass filter 510, an amplifier 512, a ramp generator 514, a time delay generator 516, and a pulse stretch conditioner 524. As also shown, the transceiver stage 112 includes a coupling capacitor 526 and an isolation capacitor 628. The coupling capacitor 526 is connected between the output of the amplifier 512 and the input/output port 120, and the isolation capacitor 528 is connected between the input/output port 120 and the input to the pulse stretch conditioner 524.

As shown in FIG. 5, the ramp generator 514 comprises an amplifier 515, a bias voltage source 517, a capacitor 519, and a switch element 521. The switch element 521 is operated with the control signal 120 to generate a ramp voltage signal 523. The time delay generator 516 is responsive to the ramp voltage signal 523 to generate a time delay for sampling the receive signal as will be described in more detail below.

The narrow pulse generator 502 and the microwave transmitter oscillator 504 form a transmitter circuit or stage for the transceiver 112 and the level measurement device 100. The other narrow pulse generator 503 and the microwave receiver oscillator 505 together with the mixer 608 and the low pass filter 510 form a receiver circuit or stage.

In operation, the clock 500 generates the clock signal 501. The rising edge of the clock signal 501 drives the narrow pulse generator 502 to generate narrow pulses for the microwave transmitter oscillator 504. The rising edge of the clock signal 501 also drives the other narrow pulse generator 503 through the time delay generator 516 to generate delayed narrow pulses for the microwave receiver (sampler) oscillator 505. The time delay generator 516 is controlled by the ramp signal 523 and the pulse generator 503 is delayed progressively more with respect to the other pulse generator 502 according to the ramp signal 523. As the ramp signal 523 increases linearly the delay introduced by the timer delay generator 516 also varies linearly.

The pulses from the microwave transmitter oscillator 504 are applied to the antenna/transducer 106 through the directional coupler 508. The directional coupler 506 functions to isolate the transmitter oscillator 504 from the mixer 508 in the receiver 110. The microwave energy reflected by the material surface being measured is collected by the transducer/antenna 106 and routed by the directional coupler 506 to the mixer 508. The mixer/sampler 508 detects the microwave (RF) energy that is received by the antenna 106, if any is present, and as the time difference between the pulses from narrow pulse generators 502 and 503 increases, the microwave receiver oscillator 505 detects RF energy at successively later times and longer distances to generate a slower version of the microwave signal. The microwave signal is scaled according to the characteristics of the ramp generator 514 and the time delay generator 516. The microwave receive signal comprises many individual samples where each individual sample comprises a transmit pulse, reflected and detected by the antenna 106 which sampled by the mixer 508 in response to pulses from the microwave receiver oscillator 505.

The microwave receive signal comprises a lower frequency signal exhibiting characteristics of a real time ultrasonic signal. The microwave receive signal is filtered by the filter 510 to remove unwanted high frequency signal components. The filtered receive signal (similar to ultrasonic signals) is then transmitted over the transmit/receive line 124 in the shielded coupler 119. As shown, the filtered receive signal may be amplified and buffered by the amplifier 512.

Referring to FIGS. 4 and 5, the control panel 117 sends a transmit pulse signal on the transmit/receive line 122 to the microwave-based level measurement device 100. The transmit pulse signal is coupled by the capacitor 528 to the pulse stretcher 524. The pulse stretcher 524 generates a control signal output 120 which enables the ramp generator 514 by opening the switch element 521. This enables the microwave transceiver 112 by allowing the clock signal pulses 501 through to the circuitry. During the measurement cycle, the signal received by the antenna 106 and sampled by the mixer/sampler 508 is transmitted back to the control panel 117 over the transmit/receive line 122 which is coupled by the capacitor 526 to the output of the amplifier/buffer 512. During the measurement cycle, power is supplied by the power storage capacitor 126 (FIG. 4) which is disconnected from the power supply through the switch 114. After the measurement, the control signal output 120 from the pulse stretcher 524 disables the measurement cycle by closing the switch 114 to charge the capacitor 126 and stopping clock pulses (i.e. through the gate 530) to the microwave transceiver 112. During this mode of operation, power is limited to essential components, such as the clock 500 which is maintained in an on-state, and power is also supplied to charge the power storage capacitor 126.

Figure 6A:
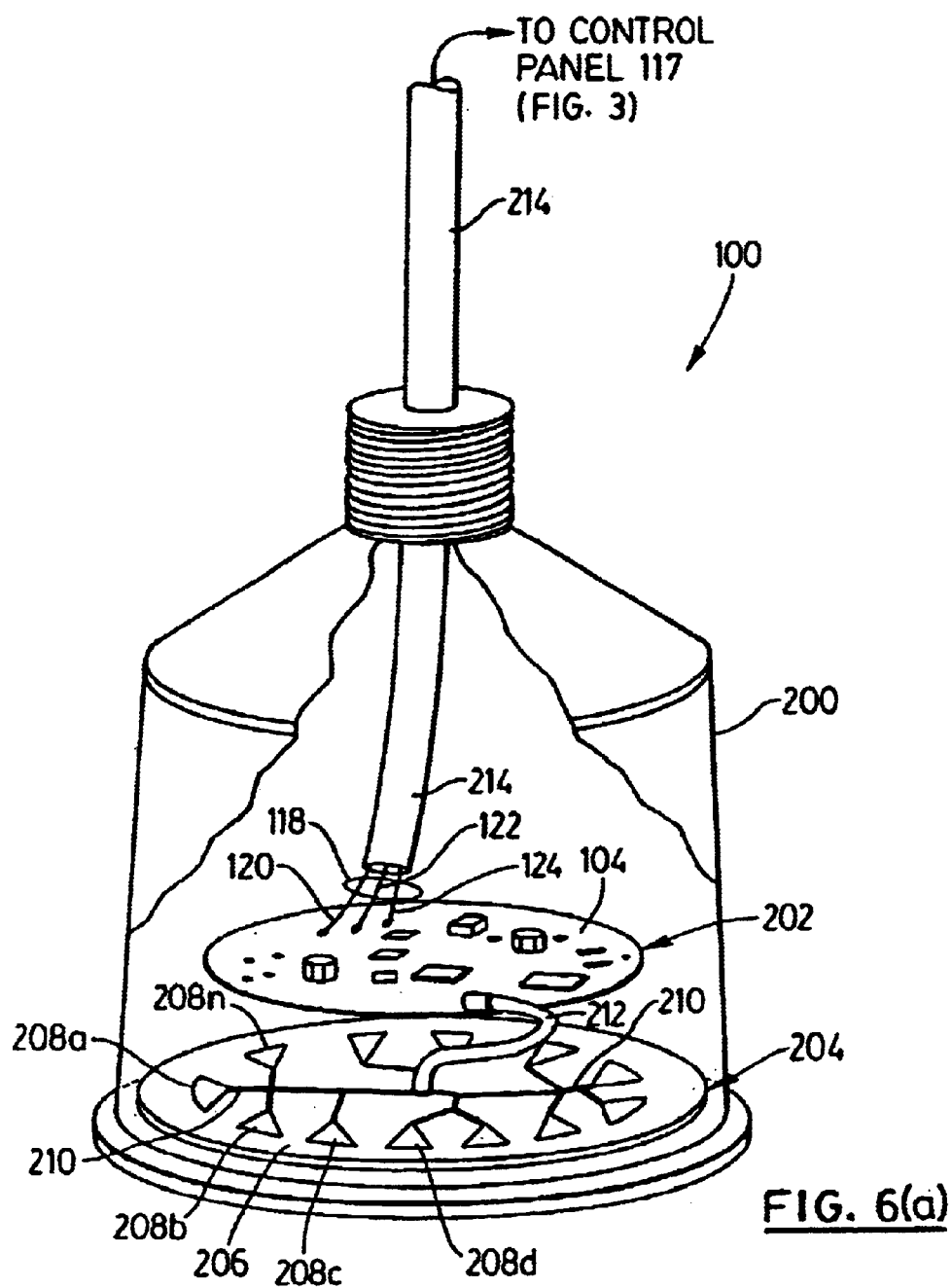
FIG. 6(a) shows in diagrammatic form a field interchangeable microwave-based level measurement device according to an embodiment of the present invention.

Reference is next made to FIG. 6(a), which shows a configuration for the microwave-based level measurement device 100. The level measurement device 100 comprises a housing or enclosure denoted by reference 200. As shown, the housing 200 contains a first printed circuit board (PCB) denoted by reference 202, and a second PCB denoted by reference 204. The first PCB 202 carries the electronic circuit 104 (FIG. 4) for the device 100. The second PCB 204 carries the microwave antenna/transducer 106 (FIG. 4). According to this aspect, the microwave antenna 106 is fabricated as a planar antenna 206 on the PCB 204. As shown, the planar antenna 206 comprises a plurality of emitter (e.g. metallic) pads 206, indicated individually by reference 208a, 208b, 208c, 208d, . . . 208n. The pads 208 are formed on the surface of the PCB 204 and are interconnected with tracks and feedlines indicated generally by reference 210 using conventional PCB fabrication techniques as will be within the understanding of those skilled in the art. The number of emitter pads 208 depends in part on the beam pattern specifications for the antenna/transducer 204.

Figure 6B:
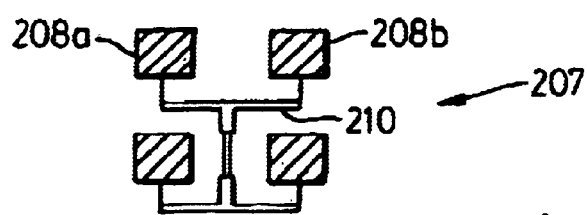
FIG. 6(b) shows in diagrammatic form an antenna array arrangement for the microwave-based level measurement device of FIG. 6(a)

While many arrangements are possible for the emitter pads 208, the planar antenna 206 needs to fit inside the enclosure 200 and should use as much of the area of the PCB 204. For example, an arrangement as shown in FIG. 6(b) may be utilized. Referring to FIG. 6(b), an array 207 is shown having emitter pads 208 spaced slightly less than a free space wavelength and each pad 208 is impedance matched to the feedline (Interconnecting) tracks 210 to achieve the required polarization, bandwidth and phasing. The size of the array 207 determines beam width. For a narrower beam, a larger radiating area, i.e. more emitter pads or elements 208, is needed. For array 207 comprising a 2×2 arrangement having an area of approximately 0.085 mm×0.085 mm, a beam width of about 28 degrees is produced at 5.8 GHz. The interconnecting tracks 210 act to transform impedances to match the transmitter (e.g. 50 Ohm) to the emitter elements 208.

As shown in FIG. 6(a), the first PCB 202 carrying the electronic circuit 104 and the second PCB 204 carrying the planar antenna/transducer 206 are configured in a vertical arrangement. A cable 212 couples the electronic circuit 104 on the first PCB 202 to the planar antenna 206 on the second PCB 204. Another cable 214 couples the first PCB 202 and the electronic circuit 104 to the control panel 117 (FIG. 4). As shown, the cable 214 carries the control input 120, the transmit/receive signal 122, and the ground connection 124 lines which are connected to suitable terminals on the first PCB 202 in addition to any other control/signal lines (not shown).

Referring still to FIG. 6(a), for the electronic circuit 104, the transmitter 108, the receiver 110 and the converter 112 stages, and the control switch 114 are implemented using suitable electronic components which are mounted, e.g., surface mounted to the first PCB 202. The electronic circuit 104 may also include or be implemented using programmable devices, such microcontrollers and/or field programmable gate arrays (FPGA's).

Figure 7:
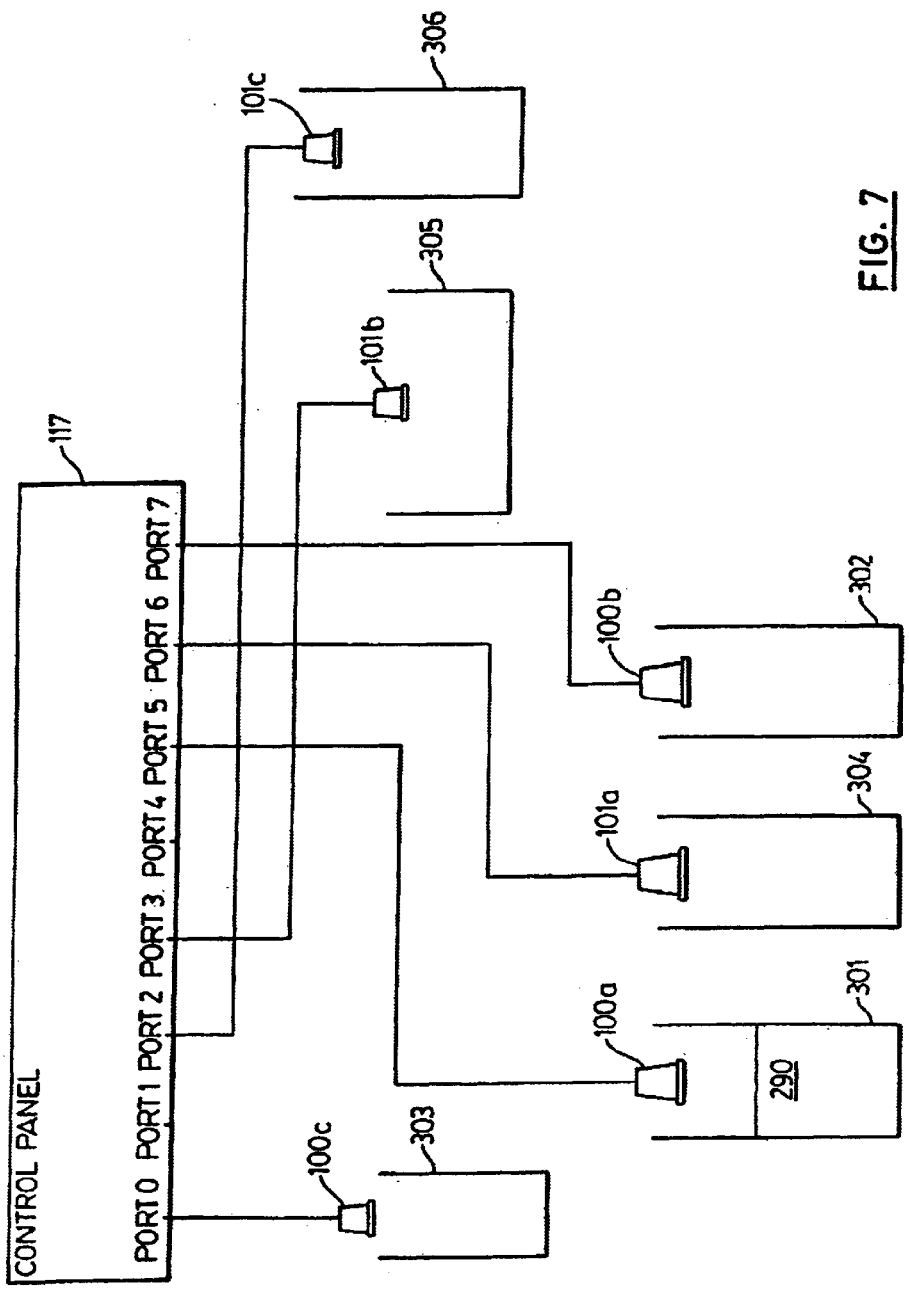
FIG. 7 shows in diagrammatic form a level measurement configuration utilizing both ultrasonic-based level measurement devices and microwave-based level measurement devices according to another embodiment of the present invention.

Reference is next made to FIG. 7, which shows a control panel 117 configured with a mix of microwave-based level measurement devices and ultrasonic-based level measurement devices. The microwave-based devices are denoted by reference 100, and the ultrasound-based level measurement devices are denoted by reference 101. As shown, the control panel 117, for example the Air Ranger XPL Plus™ panel from Siemens Milltronics Process Instruments Inc. controls three microwave-based level measurement devices 100a, 100b, 100c, each configured for measuring the level of a material contained in respective vessel 301, 302, or 303. The control panel 117 is also connected to three ultrasonic-based level measurement devices 101a, 101b and 101c. The ultrasonic-based devices 101a, 101b and 101c are configured to measure the levels of materials contained in respective vessel 304, 305, or 306. In this way, the interchangeability of the microwave-based level measurement device 100 allows for a plug-in replacement of existing ultrasonic-based level measurement devices 101 with a control panel such as the Air Ranger XPL Plus™ device.

For an Air Ranger XPL Plus™ based system, the control panel 117 may be programmed for a microwave transducer, e.g. 100 in FIG. 7, as follows:

| Velocity | 1100 m/s |
|---|---|
| Frequency | 22 KHz. |
| Blanking | 0.5 m. |

For an ultrasonic transducer, e.g. 300 in FIG. 7, the control panel 117 may be programmed with the characteristics of ultrasound in air as follows:

| Velocity | 343 m/s at 20° C. |
|---|---|
| Frequency | 44 KHz. |
| Blanking | 0.3 m. |

It is to be appreciated that there is no need to compensate for the change in velocity of microwaves in air with temperature because the effect is too small to be of concern in most simple level measurement applications.

In summary, the microwave-based level measurement device 100 according to the present invention provides modular interchangeability between ultrasonic-based level measurement devices. Microwave-based devices 100 are desirable in certain applications because as compared to ultrasonic devices, they are temperature insensitive and capable of providing more precise readings. The interchangeability also allows for the mixing and matching of microwave devices and ultrasonic devices which provides for greater flexibility in physical plant installations. The microwave-based level measurement devices 100 may also be installed in the control panel 117 to provide a redundant system configuration.

The present invention may be embodied in other specific forms without departing from the spirit or characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A level measurement device for making level measurements of a material in a vessel, said level measurement device comprising:

a housing;

a transducer for emitting energy pulses and receiving energy pulses reflected by the material contained in the vessel;

a circuit having a transmit component and a receive component, said transmit component being coupled to said transducer and said transducer being responsive to a transmit signal for emitting an energy pulse, said receive component being coupled to said transducer and said receive component generating a receive signal in response to a reflected energy pulse being received by said transducer;

said circuit including a port for coupling to a controller, and said port including an input for receiving transmit control signals, and output for outputting the receive signal to said controller;

said transducer comprising a planar antenna formed on the surface of a printed circuit board, said planar antenna having an input port coupled to the transmit component, and an output port coupled to the receive component in the circuit.

2. The level measurement device as claimed in claim 1, wherein said planar antenna emits energy pulses in the microwave range.

3. The level measurement device as claimed in claim 2, further including another printed circuit board, and said circuit being situated on said other printed circuit board, and said other printed circuit board being arranged in a spaced relationship to said printed circuit board for said planar antenna, and both of said printed circuit board being located inside said enclosure.

4. The level measurement device as claimed in claim 1, wherein said planar antenna is responsive to transmit and receive energy pulses in the range of 5.8 GigaHertz.

5. The level measurement device as claimed in claim 4, wherein said circuit includes a converter stage, said converter stage having an input port coupled to the output of said receive component and an output port coupled to the input of said transmit component, and said converter stage including a circuit for converting the output from receive component to a lower frequency in the ultrasonic range.

6. The level measurement device as claimed in claim 5, wherein said converter stage includes another circuit component for converting a low frequency input into a higher frequency output for said transmit component, said higher frequency output being in the microwave range.

7. A level measurement system for measuring the levels of materials contained in one or more vessels, said level measurement system comprising:
- a plurality of microwave-based devices;
- a plurality of ultrasonic-based devices;
- a controller, said controller having a plurality of ports for coupling each of said microwave-based devices and said ultrasonic-based devices, said controller providing control signals to each of said microwave-based and said ultrasonic-based devices to transmit energy pulses and said controller receiving reflected energy pulses from each of said microwave-based and said ultrasonic-based devices to generate a receive echo profile for each of said devices and determine a level measurement reading:
- wherein said microwave-based devices are interchangeable with said ultrasonic-based devices for said controller.

8. The level measurement system as claimed in claim 7, wherein said microwave-based device comprises: an enclosure; a circuit having a transmit component and a receive component, said transmit component being coupled to said transducer and said transducer being responsive to a transmit signal for emitting an energy pulse, said receive component being coupled to said transducer and said receive component generating a receive signal in response to a reflected energy pulse being received by said transducer; said circuit including a port for coupling to a controller, and said port including an input for receiving transmit control signals, and output for outputting the receive signal to said controller; said transducer comprising a planar antenna formed on the surface of a printed circuit board, said planar antenna having an input port coupled to the transmit component, and an output port coupled to the receive component in the circuit.

9. The level measurement system as claimed in claim 8, further including another printed circuit board, and said circuit being situated on said other printed circuit board, and said other printed circuit board being arranged in a spaced relationship to said printed circuit board for said planar antenna, and both of said printed circuit board being located inside said enclosure.

10. The level measurement system as claimed in claim 8, wherein said planar antenna is responsive to transmit and receive energy pulses in the range of 5.8 GigaHertz.

11. The level measurement system as claimed in claim 10, wherein said circuit includes a converter stage, said converter stage having an input port coupled to the output of said receive component and an output port coupled to the input of said transmit component, and said converter stage including a circuit for converting the output from receive component to a lower frequency in the ultrasonic range.

12. The level measurement system as claimed in claim 11, wherein said converter stage includes another circuit component for converting a low frequency input into a higher frequency output for said transmit component, said higher frequency output being in the microwave range.

13. A level measurement device for making level measurements of a material in a vessel, said level measurement device comprising:
- a housing;
- a transducer for emitting energy pulses and receiving energy pulses reflected by the material contained in the vessel;
- a circuit having a transmit component and a receive component, said transmit component being coupled to said transducer and said transducer being responsive to a transmit signal for emitting an energy pulse, said receive component being coupled to said transducer and said receive component generating a receive signal in response to a reflected energy pulse being received by said transducer;
- said circuit including a port for coupling to a controller, and said port including an input for receiving transmit control signals, and output for outputting the receive signal to said controller;
- said transducer comprising a planar antenna formed on the surface of a first printed circuit board, said planar antenna having an input port coupled to the transmit component, and an output port coupled to the receive component in the circuit;
- a second printed circuit board, and said circuit being situated on said other printed circuit board, and said other printed circuit board being arranged in a spaced relationship to said printed circuit board for said planar antenna, and both of said printed circuit board being located inside said enclosure; and
- a converter stage, said converter stage having an input port coupled to the output of said receive component and an output port coupled to the input of said transmit component, and said converter stage including a circuit for converting the output from receive component to a lower frequency in the ultrasonic range.

14. The level measurement device as claimed in claim 13, wherein said planar antenna is responsive to transmit and receive energy pulses in the range of 5.8 GigaHertz.

15. The level measurement device as claimed in claim 14, further comprising a converter stage, said converter stage having an input coupled to said receiver and an output port coupled to said transmitter, and said converter stage including a circuit for converting the output from receiver to a lower frequency in the ultrasonic range.

16. A level measurement instrument for making level measurements of a material in a vessel, said level measurement instrument comprising:
- a housing;
- a transducer for emitting energy pulses and receiving energy pulses reflected by the material contained in the vessel;

a transmitter and a receiver, said transmitter being coupled to said transducer and said transducer being responsive to a transmit signal for emitting an energy pulse, said receiver being coupled to said transducer and said receiver generating a receive signal in response to a reflected energy pulse being received by said transducer;

a port for coupling to a controller, and said port including an input for receiving transmit control signals, and output for outputting the receive signal to said controller;

said transducer comprising a planar antenna formed on the surface of a printed circuit board, said planar antenna having an input port coupled to said transmitter, and an output port coupled to said receiver.

17. The level measurement instrument as claimed in claim 16, wherein said planar antenna emits energy pulses in the microwave range.

18. The level measurement instrument as claimed in claim 16, further including another printed circuit board, and said transmitter and said receiver being situated on said other printed circuit board, and said other printed circuit board being arranged in a spaced relationship to said printed circuit board for said planar antenna, and both of said printed circuit board being located inside said enclosure.

19. A level measurement device for making level measurements of a material in a vessel, said level measurement device comprising:

a housing;

a transducer for emitting energy pulses and receiving energy pulses reflected by the material contained in the vessel;

a transceiver circuit having a transmit port and a receive port, said transmit port being coupled to said transducer and said transducer being responsive to a transmit signal for emitting an energy pulse, said receive port being coupled to said transducer and said receive port receiving a receive signal in response to a reflected energy pulse being received by said transducer;

said transceiver circuit including a port for coupling to a controller, and said port including an input for receiving transmit control signals, and output for outputting the receive signal to said controller;

said transducer comprising a planar antenna formed on the surface of a printed circuit board, said planar antenna having an input port coupled to said transmit port, and an output port coupled to said receive port in said transceiver circuit.

20. The level measurement device as claimed in claim 19, wherein said planar antenna emits energy pulses in the microwave range.

21. The level measurement device as claimed in claim 20, further including another printed circuit board, and sold circuit being situated on said other printed circuit board, and said other printed circuit board being arranged in a spaced relationship to said printed circuit board for said planar antenna, and both of said printed circuit board being located inside said enclosure.

* * * * *